(12) United States Patent
Foote et al.

(10) Patent No.: US 7,720,998 B2
(45) Date of Patent: May 18, 2010

(54) SYSTEM AND METHOD FOR PROMOTING MESSAGES TO A PLURALITY OF WEBSITES FROM A CENTRALIZED AUTHORITY IN RESPONSE TO A DISASTER OR EMERGENCY EVENT

(75) Inventors: Kevin Avon Foote, Tuscaloosa, AL (US); Robert Allen Carr, Pinson, AL (US)

(73) Assignee: Fast Health Corporation, Tuscaloosa, AL (US)

( * ) Notice: Subject to any disclaimer, the term of this patent is extended or adjusted under 35 U.S.C. 154(b) by 158 days.

(21) Appl. No.: 12/171,745

(22) Filed: Jul. 11, 2008

(65) Prior Publication Data

US 2009/0164665 A1    Jun. 25, 2009

Related U.S. Application Data

(63) Continuation-in-part of application No. 11/961,686, filed on Dec. 20, 2007.

(51) Int. Cl.
*G06F 15/173* (2006.01)
(52) U.S. Cl. .................................................. 709/245
(58) Field of Classification Search ............... 709/245, 709/227
See application file for complete search history.

(56) References Cited

U.S. PATENT DOCUMENTS

| | | | | | |
|---|---|---|---|---|---|
| 5,907,322 | A | * | 5/1999 | Kelly et al. | 725/51 |
| 7,010,293 | B2 | * | 3/2006 | Go | 455/414.3 |
| 7,554,440 | B2 | * | 6/2009 | Kadaba | 340/539.22 |

* cited by examiner

*Primary Examiner*—David Y Eng
(74) *Attorney, Agent, or Firm*—Russell Carter Gache; Maynard Cooper & Gale PC (57) ABSTRACT

A system and method for broadcasting messages to selected websites in order to provide emergency information to the U.S. populace, or zone applicable populace, from a central authority. This is achieved by implementing a "partial deflection" of a website altering the applicable zone file on a DNS server having authority over a website. Depending up which authority makes a request for broadcasting an emergency message, an emergency website is created and a partial deflection of the original entity's page is deflected to a main frame accompanying a header frame displaying the emergency alert message the emergency alert webpage. The requesting authority retains control over the content of the emergency message and can trigger the implementation of the broadcast from a variety of signal interfaces.

29 Claims, 7 Drawing Sheets

SYSTEM AND METHOD FOR PROMOTING MESSAGES TO A PLURALITY OF WEBSITES FROM A CENTRALIZED AUTHORITY IN RESPONSE TO A DISASTER OR EMERGENCY EVENT

This application claims the benefit of filing priority under 35 U.S.C. §119 and 37 C.F.R. §1.78 from non-provisional patent application Ser. No. 11/961,686 filed Dec. 20, 2007, for a SYSTEM AND METHOD FOR REDIRECTING A WEBSITE UPON THE OCCURRENCE OF A DISASTER OR EMERGENCY EVENT. All information disclosed in that prior application is incorporated herein by reference.

FIELD OF THE INVENTION

The present invention relates generally to the Domain Name System ("DNS") as implemented on the Internet, but it also relates to the mechanics of operation of the Emergency Alert System, which supplanted the well known Emergency Broadcast System. In greater particularity, the present invention relates to the redirection of website addressing upon the occurrence of a specified signal. In even greater particularity, the present invention relates to the centralization of redirecting websites upon the occurrence of specified signal, such a signal likely resulting from an emergency event.

BACKGROUND OF THE INVENTION

The Emergency Broadcast System ("EBS") was a well known emergency warning system in the United States, used from 1963 to 1997, but which was replaced by the Emergency Alert System ("EAS") in 1994. Jointly coordinated by the Federal Communications Commission (FCC), Federal Emergency Management Agency (FEMA), and the National Weather Service (NWS), the EAS is designed to enable the President of the United States to speak to the United States within 10 minutes, and to allow local geographical zones to be addressed by local authorities, when needed. Hence, each State has its own EAS plan to allow it to take advantage of the national EAS system. The EAS regulations and standards are governed by the Public Safety and Homeland Security Bureau of the FCC.

The EAS expanded the communication coverage previously offered by the EBS and now uses a plethora of communications mediums to communicate messages. For example, the EAS now covers general radio type signals such as AM/FM/ACSSB(R)(LM(R)), general broadcast television signals such as VHF Low/VHF Medium/VHF High/UHF stations, cable television including systems that support HRC/IRC/ICC/STD/EIA, wireless cable television, Digital television, digital cable, XM Satellite Radio, Sirius Satellite Radio, Worldspace, In-band on-channel (IBOC) communications, Digital Audio Broadcasting (DAB), DIRECTV, the Dish Network, Muzak, DMX Music, Music Choice, all other Direct Broadcast Satellite providers, and Video Dial Tone (OVS) services.

The FCC requires all broadcast stations (see above list of types) to install and maintain EAS decoders and encoders at their control points. These decoders continuously monitor the signals from other nearby broadcast stations for EAS messages. For reliability, at least two other source stations must be monitored, one of which must be a designated local primary. Broadcast stations are also required to be aware of the latest EAS protocols, maintain the latest version of the EAS handbook, and keep logs of all received and transmitted EAS messages, which are typically recorded electronically on a personal computer.

In addition to the audio messages transmitted by radio stations, television stations must also transmit a visual message such as text "crawl" displayed at the top of a transmitted display screen. A color coded "crawl" system is often used where the color signifies the priority of the message, but some television stations transmit only a visual message. A television station may be used for monitoring by another station and, thus, an audio signal also is necessary.

Upon reception of an alert, a station must relay an Emergency Action Notification ("EAN") and an Emergency Action Termination ("EAT") message immediately to their listeners/viewers and other stations. Some stations have been allowed to "opt out" of relaying some alerts, such as severe weather and child abduction emergencies (e.g. AMBER Alerts), and some stations may be "non-participating" type stations and do not relay any messages. Instead they transmit a message instructing listeners/viewers to tune to another station for the broadcasted information, and they must then suspend their own operation.

A digital version of EAS called Digital Emergency Alert System (DEAS) is currently being rolled out to the US after the implementation of a pilot program and is designed to deliver next generation alert and warning capabilities to the American public. DEAS is a wireless digital data delivery system that utilizes a process called "datacasting" which is a one-way broadcast service. The intent of the new DEAS system is to utilize existing high-speed networks to stream video or disseminate large files to thousands of locations simultaneously through a process called "datacasting."

Datacasting offers the potential to reach greater distribution audience and provide greater amounts of information to a warning recipient. In theory, the technology will allow the DEAS system to be addressable so that public safety officials can pinpoint to whom the information is sent, and distribute critical information over a variety of media, such as cell phones, PDAs, pagers and computers. Datacasts are transmitted through a digital television signal and a receiver hooked up to a personal computer, laptop or computer network. However, homes, schools, government buildings and businesses can only receive the alerts and information in a datacast by installing a special receiver and antenna. Hence, while high-speed networks are utilized to transfer digital files, the existing radio broadcasting systems are utilized to reach listing public and the existing Internet WWW services are not utilized. Since, special equipment is required for a personal computer to become a recipient of any broadcast alerts, incorporation of even a modest percentage of personal computers in use in the U.S. is unlikely.

It is surprising that the Internet is not fully included in the EAS, or the DEAS, notwithstanding the fact that the Internet has become a ubiquitous data communications channel for a majority of the US population. However, the reason is likely that the implementation of the current EAS or DEAS systems on the Internet is not feasible as the topology of the Internet is a distributed network, and no centralized authority currently controls access to services offered over the Internet, as was purposeful in is design. Nevertheless, a type of centralized control may be implemented voluntarily throughout the world wide web through manipulation of the current domain naming conventions of the Internet, as will be disclosed. Hence, some understanding of the structure and function of certain aspects of the Internet are required in order to appreciate the herein disclosed centralized system.

The "Domain Name System" on the Internet associates various sorts of information with so-called "domain names" and provides for a user friendly addressing process for the Internet by translating human-readable computer host names into the IP addresses. This process is known as "name resolution" and may be handled in various ways, but the most common method is for name translations to occur through the DNS system (hereinafter "Internet DNS" or simply "DNS").

For example, the numerical address 66.230.200.100 is provided to Internet users' machines when the human readable address www.wikipedia.org is typed into an Internet browser addressing bar. The translation of a domain name or other human readable text into IP addresses provides the addressing scheme that networking equipment needs to deliver webpages to PCs around the world, and to provide other information such as addresses for mail exchange servers and other services available over the Internet. In providing a worldwide keyword-based addressing scheme (i.e. essentially a redirection service), DNS is a critical component for the functioning of today's Internet. Since the Internet is the dominant medium through which most information is propagated throughout the world, the implementation of DNS is nothing less than a monumental data communications achievement.

While other computer programs exist that process name resolution requests from computer to computer on a network, as of the filing of this application the most prevalent method for Internet name resolution is dictated by the aforementioned DNS process invented by Paul Mockapetris in 1983 and governed by RFC ("Request for Comment") 1034 and 1035 as adopted by the Internet Engineering Task Force (IETF) in 1986. RFCs 1034 and 1035 made obsolete the prior RFCs 882, 883, 973 as adopted circa 1983-84. DNS is one of the original Internet standards, although new applications and extensions to DNS are continually being evaluated by IETF and the Internet community at large. The RFCs 1034 and 1035 specification is hereby incorporated by reference.

While the total scope and operation of DNS is not necessary for a complete understanding of the herein described centralized deflection system, a few concepts are described below to facilitate the implementation of the centralized system, as discussed in the description of the preferred embodiments.

Name resolution in its simplest form is achieved by an ASCII text conversion table stored on each computer, traditionally know as a "HOSTS" file. At a local network level, a lookup table is maintained to list different machines that are added to the network and assigned numbers associated with each machine name through a program such as Windows DHCP program. The lookup table on a local network is updated only once for each new machine that is added (e.g. a new PC, a router, a printer, etc.) and is usually administered by a local DNS type program, such as the Microsoft Windows based program "WINS" (Windows Internet Name Service). Since HOST files are updated manually, and since even an automatically updated conversion file saved on a local machine would become impossibly large to accommodate all of the domain names used on the Internet, DNS changes this to delegate the lookup or resolution process across a distributed plane of name servers.

When an entity registers a human readable domain name (currently, letters and numbers and a few special symbols, but this is being expanded) with one of the dozens of ICANN authorized registrars (e.g. www.register.com), the registering entity specifies two DNS servers associated with a selected domain name, a primary and a backup DNS server. These servers are the authoritative sources for DNS information regarding the selected domain name and machines connected to a network on the domain. When a user of the Internet attempts to contact a system in the network domain of the registered domain name, the machine utilized by the user will check progressively from its own DNS server's lookup table, to other machines connected thereto, to Internet core servers, and finally to the authoritative servers themselves to translate the spelled name into an IP address. This occurs through the action of a program in the DNS system called a "recursor" that sends and responds to addressing queries from other DNS servers in an iterative process. Currently, a popular UNIX based DNS resolution program that includes a recursor is BIND ("Berkeley Internet Name Domain"). Responses from these recursor programs usually are either error messages or a "pointer" to which the recursor program might send additional queries to find the host machine. Upon receiving a request, a DNS server contacted by a recursor program of another DNS server can respond in four ways:

1. It can answer the request with an IP address because it already knows the IP address for the domain.
2. It can contact another name server and try to find the IP address for the name requested. It may have to do this multiple times.
3. It can say, "I don't know the IP address for the domain you requested, but here's the IP address for a name server that knows more than I do."
4. It can return an error message because the requested domain name is invalid or does not exist.

This process is iteratively continued until a name is resolved and the host computer is contacted.

Once the resolution process is complete, in theory, various DNS server machines, and other intermediate name resolution machines, will propagate the human readable name's IP address association to their tables so that name resolution is facilitated across the Internet. Further, local DNS tables are configured to retain information (referred to as "caching") so that addresses used most often by its domain users are quickly accessible to facilitate the rapid functioning of DNS.

Usually, an ISP like "yahoo" or "Earthlink" will administer domain names and their associated webpages and resources for a contracting an entity. But, quite often, organizations will maintain their own domain name and resources. For example, "HowStuffWorks" a well known information Internet site maintains their own machines dedicated to their website, including administering their own DNS server. As published on their website, they have a primary server and a secondary, as such:

AUTH-NS1.HOWSTUFFWORKS.COM 209.116.69.78
AUTH-NS2.HOWSTUFFWORKS.COM 209.116.69.79

Their primary DNS is auth-ns1.howstuffworks.com and any changes they make to this site is automatically propagated to the listed secondary site, which is maintained not by them, but by their ISP.

HOWSTUFFWORKS uses the name server software BIND for their domain and they have a zone file (similar to the functioning of a HOST file, but formatted for DNS) on their host DNS server having the following form:

| @ | NS | auth-ns1.howstuffworks.com. |
|---|---|---|
| @ | NS | auth-ns2.howstuffworks.com. |
| @ | MX 10 | mail |
| mail | A | 209.170.137.42 |
| server1 | A | 216.183.103.150 |
| www | CNAME | server 1 |

This is a typical zone file and has the following meaning. The first two lines point to the primary and secondary name servers. The next line is called the "MX record" which indicates that it is a Mail Exchange or e-mail SMTP server with the name "mail." The next line indicates the IP address for the machine that handles a request to mail.howstuffworks.com, which handles the mail. The next line indicates to the main machine (server1) that will handle requests to howstuffworks.com. This line is also know as the "A NAME" record which lists the primary computer IP address. The next, and last, line points to the IP address that will handle requests to www.howstuffworks.com.

As seen in the information in the zone file, several physical computer machines at separate IP addresses make up the computer server infrastructure for the website www.howstuffworks.com. And, one will also note that a "CNAME" record appears in the above zone file on the last line. CNAME is short for "canonical name," which is usually referred to as a CNAME record. A CNAME record in a DNS database, like the zone file above, is a record that indicates the true, or "canonical," host name of a computer with which its aliases are associated.

CNAME records can be used when a computer or service needs to be renamed to temporarily allow access through both the old and new name, or to point a sub-domain to another domain, or to have a sub-domain point to a computer outside of the host domain. In the above zone file example, the CNAME record redirects all world web entries http://www.howstuffworks.com to the "server1" IP address listed under the A Name record. CNAMES are often used to redirect address bar mistakes entered into Internet browser software fields. For example, many HOST record files redirect incorrect entries like http://wwww.domainname.com and http://ww.domainname.com to http://www.domainname.com, which is helpful for instances when an Internet user do not enter the correct number of "w"s in the browser address bar of their Internet browser program like Internet Explorer. The complete usage and acceptable forms of CNAMEs may be found in RFC 1034.

As was fully discussed in application Ser. No. 11/961,686, the usage of CNAMEs provides a means for redirecting access to websites, domains, sub-domains, resource records, etc., and it may be done in an automated fashion. Pursuant to the referenced application, the automated altering of zone files permits the "deflection" of websites when combined with novel uses of CNAMEs. Further, the alteration of a websites function and appearance is also possible using CNAME manipulation in zone files.

Nevertheless, the redirection of webpages to provide an alternative content to be delivered to a requestor over the Internet, such as if the computer server delivering the original content is destroyed in a disaster event, does not provide a means for a central authority to broadcast an emergency message to a computer user accessing various websites on the Internet.

Hence, what is needed is a centralized system for quickly and simply providing emergency messages to websites either subscribing to or being required to implement an emergency broadcast system. The system should either be integrated with the EAS or DEAS, or be available as an adjunct to these systems. The implementation of this process should cause no disruption to the Internet structure, including especially DNS, so that access to the websites will not be otherwise inhibited.

SUMMARY OF THE INVENTION

In summary, the present invention provides a system and method for broadcasting messages to selected websites in order to provide emergency information to the U.S. populace, or zone applicable populace. This is achieved by implementing a "partial deflection" of a website altering the applicable zone file on a DNS server having authority over a website and publishing an emergency alert website that includes an emergency alert message.

BRIEF DESCRIPTION OF THE DRAWINGS

A system and method for promoting messages to a plurality of websites from a centralized authority in response to a disaster or emergency event incorporating the features of the invention are depicted in the attached drawings which form a portion of the disclosure and wherein.

DESCRIPTION OF THE PREFERRED EMBODIMENTS

Figure 1:
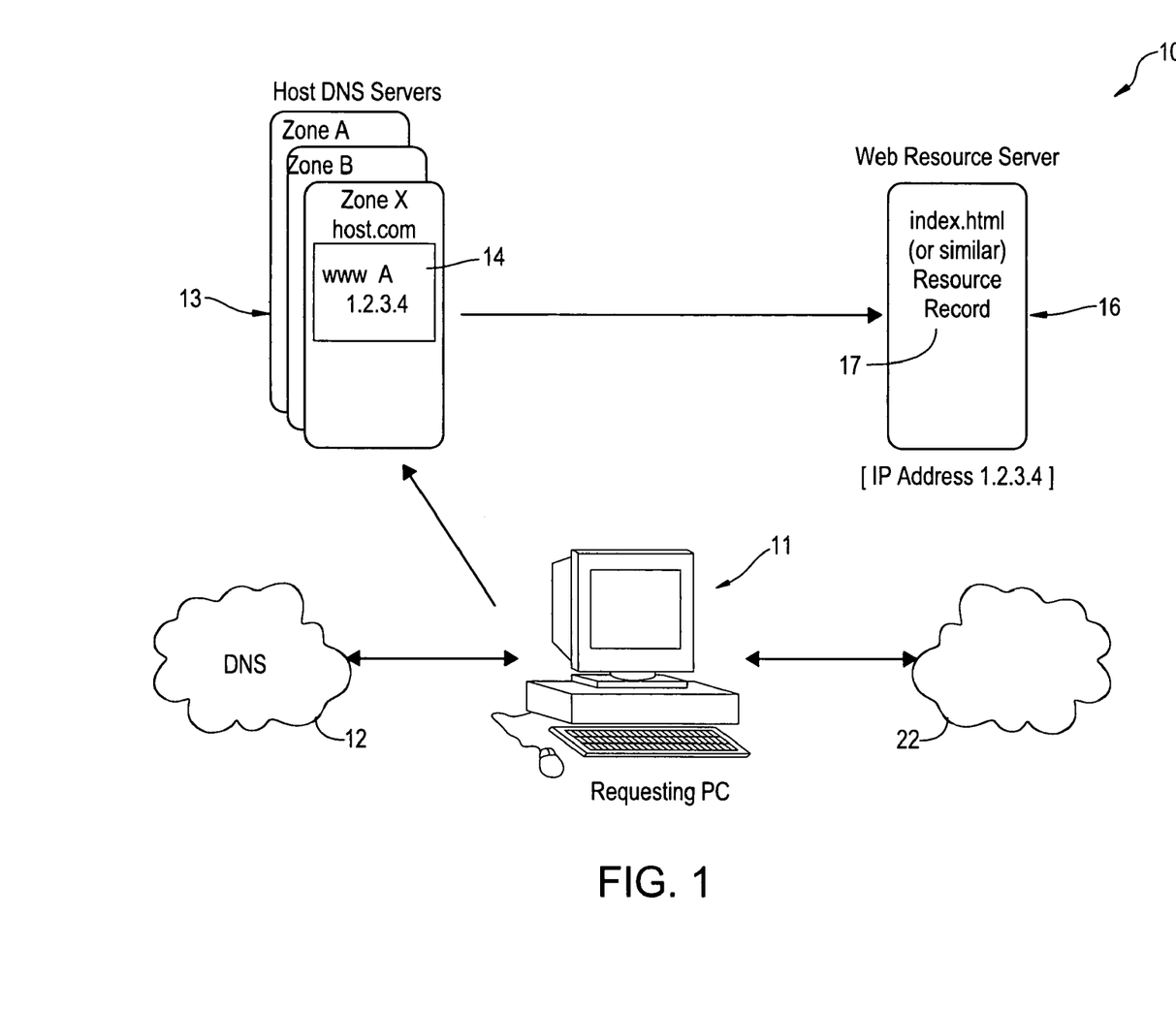
FIG. 1 is a block diagram showing the nominal interaction of Internet DNS and a PC user making a webpage request.

Referring to the drawings for a better understanding of the function and structure of the invention, FIG. 1 shows a typical webpage request process 10 when requesting PC 11 attempts to resolve a human readable name associated with an Internet webpage utilizing the DNS system 12 over the Internet. A DNS software application running on a server connected to the PC 11 supplies DNS name resolutions to the requesting PC 11 during a webpage request. DNS 12 working in tandem with the DNS software application provides an Internet protocol ("IP") address enabling the requesting PC 11 to make a direct request for a resource present on a web server 16 via zone host DNS server 13 which is then supplied to the requesting PC 11 over the Internet 22. The zone host DNS server 13 includes the authoritative information about a resource located on the web server 16 in the form of a "zone file" 14. The zone file includes A NAME records and CNAME records, as the case may be, and the IP address of the web server 16 is of the form 1.2.3.4 as shown.

Application Ser. No. 11/961,686 described in detail a system for redirecting (i.e. "deflection") a requested web resource that maintains the availability of world wide web content irrespective of the availability or operation of an entity's web server or its authoritative DNS server. The details of that process as already incorporated by reference herein are hereby restated and re-referenced, including the presented programming code tables, so that the reader may fully understand the process by which the DNS system is manipulated to present substituted content upon the submittal of a resource request by a PC user. An understanding of the processes in that referenced application are expected for a full understanding of the herein presented system and method in FIGS. 2-7. Some aspects of that prior disclosed system have been altered to achieve the herein described results, as will be discussed.

Figure 2:
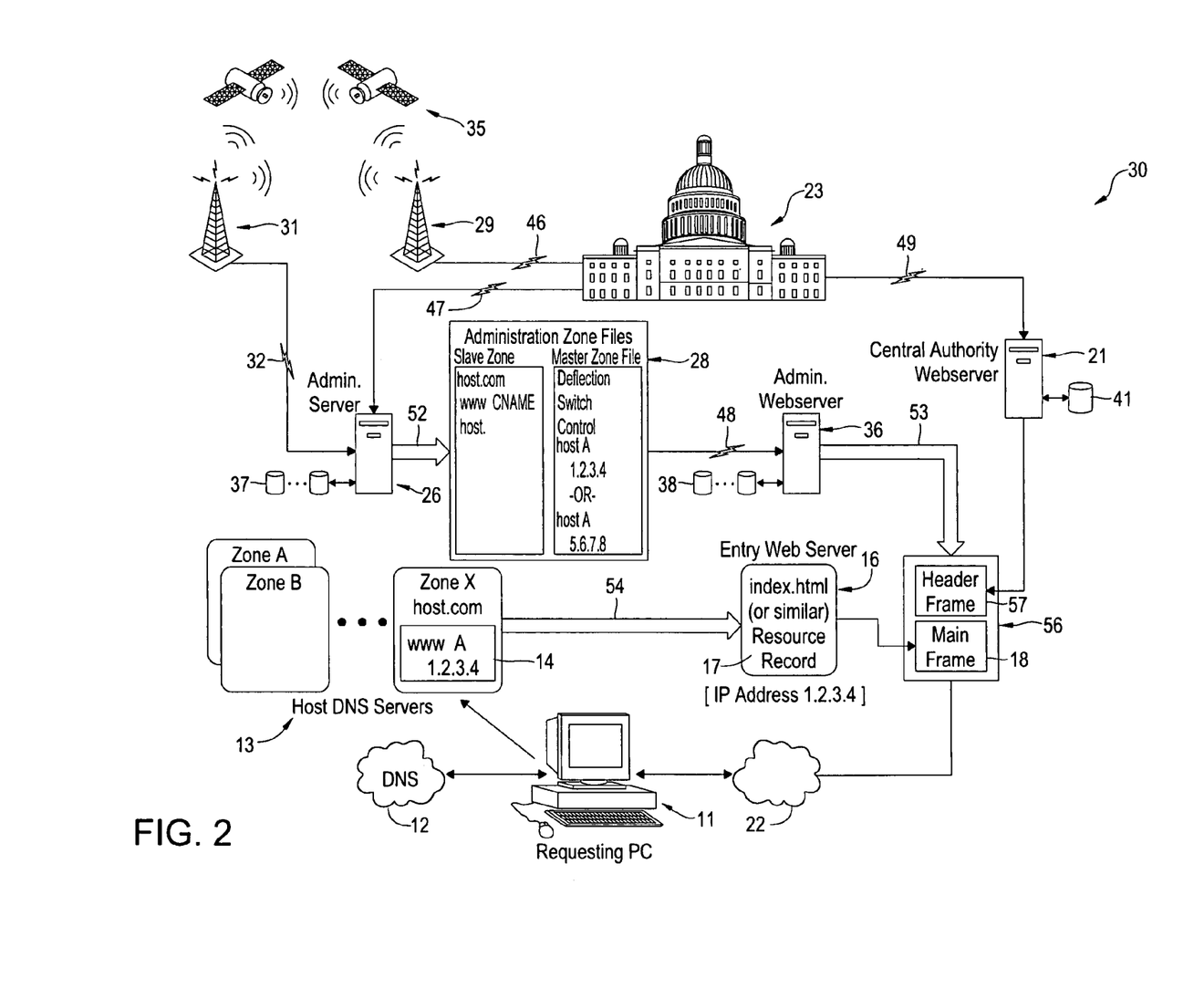
FIG. 2 is a system wide block diagram of the system affecting the logical DNS associations to promote an emergency message from a central authority to PC users viewing a selected website.

Referring to FIG. 2 it may be seen that the herein disclosed system requires an intervening administration DNS server(s) 26 to be positioned within the DNS resolution topology to allow for monitoring and control of web services offered by entity web server 16 and to accomplish emergency deflection of a website inquiry in order to convey an emergency message from a central authority. The system 30 uses the administration DNS server(s) 26 to monitor and control the content of zone file 28 such that upon the occurrence of an emergency alert action ("EAA") from central authority 23 (i.e. deflection to a pre-specified site) the appropriate zone file 28 is edited and published to controlling DNS server 26. Such an EAA request may be initiated via a network connection 47, including a global connection such as the Internet, a radio tower emission 29 in which receiving towers 31 may propagate the request 32, satellite based communication paths 35, or any other type of pre-specified target message transmission initiation such as cell phone, PDA, remote client PC, etc., that can communicate with server 26. Server 26 includes sufficient redundant storage 37 to accommodate numerous zone files representative of any site that relinquishes control to server 26. Alternatively, a single zone file might be configured to accommodate all sites within the control of server 26, as desired. Affected Zone files will be a slave file referencing an applicable CNAME record and a master administration zone file specifying a replacement webserver resource address to replace resource record 17 address provided by webserver 16. Upon the publishing of zone files 28, retrieval of redirected requests to replacement content held in storage 38 is provided by administration webserver 36, preferably over a network connection 48 in direct communication with administration server 26, but alternatively webserver 36 could be in communication with administration server 26 over the Internet, albeit with less security. Webserver 36 supplies an emergency alert webpage ("EAW") 56 having a header frame 57 and a main frame 18 when requested by PC 11. Typically, the EAW 56 will be created at each request, but could consist of a pre-configured, static HTML page having specific internal addressing variables adjusted prior to delivering to a requesting PC 11. Irrespective of the mechanism for creating the EAW 56, page 56 will include a main frame 18 directing PC 11 to request the same original content 17 from entity webserver 16 as was available prior to the initiation of an EAA, and a header frame 57 directing PC 11 to obtain central authority controlled content such as an emergency alert message ("EAM") from a central authority webserver 21 having redundant storage 41. Alternatively, header frame content 57 may be pre-configured as a file retrieved from storage 38 and supplied with page 56 when requested by PC 11. Irrespective of the source of frame content, the page 56 and its content is supplied to PC 11 over the Internet 22 in a conventional fashion.

As will be understood, header frame content may vary in accordance with the wishes of the central authority's wishes and communication goals. For example, header content might include auto start multi-media files, such as embedded video or audio files, it might present alternative selectable links to additional information, or it might automatically execute files placed on the client PC to initiate some other type of local processing sequence. Such auto-initialization of local PC processing allows for better potential of continuity of operations for central authorities and potentially allows for central authority personal to establish a "telepresence" with its partners and constituents to enhance non-verbal communication transmission.

As may be seen, administration server 26 may be controlled by an issuing central authority 23 or an independent third party working under contract for the central authority 23. Further, webserver 41 while likely under direct authority and control of the applicable central authority, could also be owned and operated by an independent third party having a responsive relationship with the managing central authority 23.

Central authority 23 could be the federal government, however, any authority in a lesser hierarchical relationship to the federal government may initiate an EAA having an EAM associated with the particular authority making the request. Such an issuing authority would supply a message mapped to specific websites associated with a particular type of EAA, via a customized EAW 56. For example, a state government, a county authority, a city government, or other delegated governing authority, such as for example a water works authority or weather authority, might initiate an EAA. Hence, system 30 is configured to accommodate numerous authorities issuing various EAAs, even simultaneously, as will be addressed.

Figure 3:
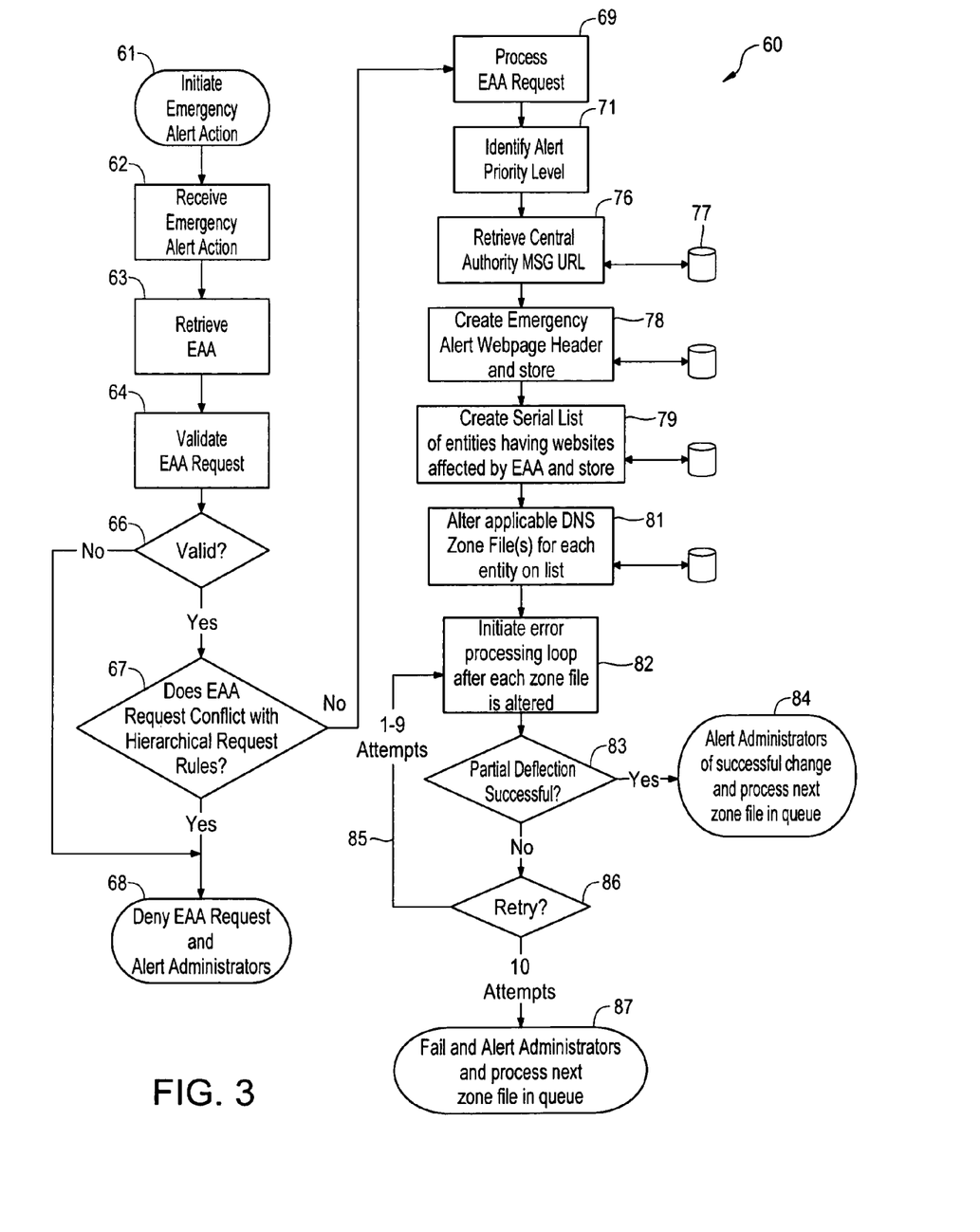
FIG. 3 is a process flow diagram showing the primary steps associated with the processing of an emergency message promotion into a website.

Referring now to FIG. 3, initiation of the EAA process 61 is typically started with the issuance of a web based form retrieved from server 26 by a user at the central authority 23 and selecting one of a number of emergency messages preprogrammed for the accessing authority in a user friendly selection format presented on screen. The screen essentially serves as a control switch to select different resource records residing on central authority webserver 21 that will be used as the content for the header frame 57, and the means for the server 26 to identify which central authority is issuing the EAA. Hence, different types of messages may be established for header frame 57 in the partial deflection process, with each message associated with a time or other type of parameter which may be selected or switched on via the web base control. The EAA form typically resides on the administration server 26, but may reside anywhere that has effective communication with the administration server 26. For example, a person with a notebook computer may be able to access, assuming the correct passwords are provided, the EAA form from any location on the planet, including the authority's primary physical location. As will be understood, any type of device able to read webpages over the Internet, including Internet enabled cell phones, PDAs, etc. would be able to initiate an EAA. The inventors anticipate that various types of self-explanatory selection criteria and boxes may be presented to a central authority representative desiring to initiate an EAA, but the actual form style associated with the various messages and type of central authority will likely vary depending upon the tastes and requirements of each authority. It should also be apparent that since the initiation of an EAA is accomplished via a post command, as will be discussed, the initiation of an EAA may be accomplished over a radio network where a receiving station 31 (see FIG. 2) initiates the post commend. Initiation of an EAA via a radio signal may be desirable in order to maintain interoperability with an existing EAS, and in order to provide flexibility to a central authority to issue an EAA from an Internet void communications area.

Upon the initiation of an EAA, a file is written on the administration DNS server 26 at a known directory location (e.g. a drop-off location) which initiates 61 the EAA process 60 after reception 62 of the request. The server 26 checks periodically, but typically every 1-3 minutes, in the drop-off directory to see if a file or multiple files are present. It then retrieves 63 the files in the order of creation, oldest first. Each file that is written to the drop-off directory includes a known set of information to allow for error detection and validation of the file creation. The information that is contained in the file is also written into a database on the server. For example, the information in the file may be written to a database backend such as MY SQL. The actual creation of the file and entry into the appropriate database is effected by a "post" command via the HTTP protocol from the originally presented web form. Data in the file created by the administration DNS server 26 has the format shown below in Table 1.0.

TABLE 1

14:1:FastCommand

AZJYYZQXT5N1Q723FHI5LQJMJGQO3FH34QSSF8GZ4UQLRJFWQNR241FE7VS00ZTVGCDMBKB54RHL1M

7IZPAUGFYE1G4S6ODCRHOS

40cfb99c5084cafcafd0f9d62196bd8e

The request file includes information which is pre-populated by information already present in the database file on the server and associated with the central authority's identification and selection action. The first line of the deflection request file includes, separated by colons, a request ID "14," Authority ID "1", and the message which the authority wishes to issue. The second line comprises a unique identification string to allow for the execution of a checksum validation and for database correspondence verification once the data in the deflection request file is written to the database. The next line is left blank simply for syntax and file protocol verification and does not consist of any viable data. The last line is a validation string to allow for one-way encryption and of the EAA request file. The syntax of any EAA request file may vary depending upon the desired parameters to be received and interpreted by the EAA database in storage 37, however the inventors have found that this format is simple and ensures integrity of request reception with a minimum of errors or unauthorized intrusions. In table format, the meaning of each line in the request file has the syntax shown in Table 2.0.

TABLE 2.0

<ReqID>:<ClientID>:<FC State>

<Request Validation String>

<blank>

<Host Validation String>

The data structure in a MY SQL database does not have an obligatory format, however the inventors have found that the format of the database as shown in Tables 3.0 and 4.0 are helpful in the validation process for processing EAA requests in accordance with the deflection process disclosures made in application Ser. No. 11/961,686. The tables 3.0 and 4.0 below correspond to the file creation structure which correlates with a deflection request made in application Ser. No. 11/961,686, but would also be applicable to any EAA request made by a central authority.

TABLE 3.0

| 51 | 59 | efc15c539645d954a581acbc3f5753ab | 0 | 63.146.226.114 | 12.150.248.39 | 1 |
|----|----|----------------------------------|---|----------------|---------------|---|
| 52 | 60 | 87b31f7cf1b506abb4ec1c06e386e526 | 0 | 12.166.66.102  | 12.150.248.39 | 1 |

TABLE 4.0

EAA Database Request Sample

| id host | clientID | reqstate | signature oldIP | timestamper | chksum |
|---|---|---|---|---|---|
| 59 www.methodisthopsital.net | 11 | FastCommand 916MSDQSKLTT408Z4RVJPOCKZMF4ARU9JQM1T2X4EH097MZ14KAJAPU02ZV3HF2QWFIG75ACD0CA112VC35DJP3BF04MUX3G2BN0 63.146.226.114 | 2007-11-14 11:51:54 | NULL |
| 60 www.methodisthospital.net | 11 | normal GK71JF74DV51P0HKU88JWUXD49F8PZMW9JNJPKDT59KLZSWJQVTCGHGAGM9WBLIBVVKB6OU2N4ECN1M3N66TDDUJPT6R5ESR03SX 12.166.66.102 | 2007-11-16 13:31:12 | NULL |

Returning again to FIG. 3, the EAA request file retrieved during step 63 is validated 64 to confirm an authentic request. Validation may be achieved in various ways as is known in the art, however the inventors for the present system utilize a numerical matching strategy to validate both database entry and the integrity of data in the EAA request based upon the confirmation of known data appearing on line 4 of the EAA request file. The control of the post back of information being written into a file directory on the server and the information contained in the file being written into MY SQL database is controlled by a PHP program running on the server (see FIG. 5, top portion). Typically, the server attempts to retrieve a request file every few minutes or during a pre-selected interval, and to the extent that the directory is empty the system understands that a validation request is not present and takes no action. However, upon the occurrence of any file in the pre-selected drop-off directory the EAA request initiates processing of that file, and after being stored in the database as discussed above, is deleted from the drop-off directory. In the event that the drop-off directory includes multiple files (i.e. multiple EAA requests from, potentially, multiple authorities), all the files are picked up and processed, and then deleted from the directory at timed intervals, typically every 1-3 minutes. Each EAA request is processed sequentially in chronological order in conformance with the file's creation date.

The EAA request file is then validated 64 by comparing the validation text string in the file with a text string present in the database on the server 26. Since the validation string in the database provides one of the inputs directly into the file creation, a validation that the file has come from a known source may be made. Essentially the validation process matches the validation request ID to confirm that the request strings match. Further, since the user is authenticated prior to being able to access the deflection webform, some information is already associated with the authority and can also be written into the SQL database as well. In the event that the validation process fails 66 a denial request message is logged in the database, and the administrators are alerted 68. If the validation request is validated, the EAA request is then interpreted by hierarchical request rules 67 to determine if the request conflicts with other pending or initiated requests, as will be discussed. If a conflict rule is violated, the request is denied and the administrators are alerted 68. If no conflict exists, the EAA request is processed 69.

Initially, the webpage 56 and alert priority level associated with the requesting central authority is identified 71, and the specified emergency message to which an EAA request applies is retrieved 76 from local storage 38 or remote central authority webserver storage 41. As may be understood, various types of alert messages depending upon the type of alert desired to be communicated may be stored for later use. This structure allows for the flexibility to permit many different types of authorities, each with a variety of alert situations, to be pre-stored and utilized upon demand. This structure also allows for the migration of successive alert messages to be promoted as emergency situations develop from a primary alert and advisory situation to a remedial response message situation. Hence, primary, secondary, and additional alert message states may be invoked via successive EAA requests to be initiated at a time of choosing of the central authority.

Once all of the information associated with the alert message has been obtained, a static template for the EAW webpage 56 may be created and stored 78 for further retrieval and modification, potentially in real-time. An example PHP configuration file successfully used by the inventors in an Apache webserver application that establishes the communication structure for responding to a remote PC's request for delivering an EAW is shown in table 5.0. The configuration file is essentially a virtual hosts access control file in which lines 2-4 force the creation of a two frame webpage to be served to the remote requesting PC by the webserver 36. Lines 5-8 simple cause an immediate expiration of any served pages so that old content is not retained in a PC browser cache. An example potential EAW header frame webpage referenced by the configuration file of table 5.0 is shown in table 6.1. An example potential EAW webpage including both main frame and header frame served to a requesting PC is shown in table 6.2.

TABLE 5.0

```
RewriteEngine on
RewriteRule ^headerpage.php$ headerpage.php [L]
RewriteCond %{HTTP_HOST} !^.*\.fastcommand\.com [NC]
RewriteRule (.*)$ frame.php [L]
ExpiresActive On
ExpiresDefault "access plus 1 seconds"
Header Set Cache-Control "max-age=0, no-store"
--
```

TABLE 6.1

```
<?php
$pdomain='www2.cityhospital.us.com';
$pcolor='orange';
$ptitle='Hazardous Chemical Spill';
$pbanner='Overturned truck EAST of campus with possible hazardous chemicals spilled.';
$plink='http://demo.fastcommand.com';
?>
```

TABLE 6.2

```
-- Frame.php --
--      --
--      --
<?php
header("Cache-Control: no-cache, must-revalidate"); // HTTP/1.1
header("Expires: Mon, 26 Jul 1997 05:00:00 GMT"); // Date in the past
if(file_exists("./partial_deflection.php")) {
        include("./partial_deflection.php");
} else {
        echo "Error: FastCommand&tm; Partial Deflection has been enabled for this site, but it has not been properly configured. Please contact FastCommand immediately to resolve this error.";
        exit;
}
if (!$pdomain){
        echo "Error: FastCommand&tm; Partial Deflection has been enabled for this site, but it has not been properly configured. Please contact FastCommand immediately to resolve this error.";
        exit;
}
```

TABLE 6.2-continued

```
if(preg_match("Λ.(jpeg|jpg|gif|bmp|png)$/",$_SERVER['REQUEST_URI'])) {
$redirect_string="http://".$pdomain.$_SERVER['REQUEST_URI'];
header("Location: $redirect_string");
exit;
}
$redirect_string="http://www2.cityhospital.us.com".$_SERVER['REQUEST_URI'];
$redirect_string="http://".$pdomain.$_SERVER['REQUEST_URI'];
?>
<html>
<head>
<META HTTP-EQUIV="Pragma" CONTENT="no-cache">
<META HTTP-EQUIV="Expires" CONTENT="-1">
<META HTTP-EQUIV="CACHE-CONTROL" CONTENT="NO-CACHE">
<title>NEIDS -- <?=$ptitle;?></title>
</head>
<frameset framespacing="0" border="0" rows="70,*" frameborder="0">
    <frame name="header" scrolling="no" noresize target="main2" src="/headerpage.php">
    <frame name="main2" marginwidth="0" marginheight="0" scrolling="auto" src="<?=$redirect_string;?>">
    <noframes>
    <body>
    <p><?=$ptitle;?></p>
    <br><br>
    <p><?=$pbanner;?></p>
    </body>
    </noframes>
</frameset>
</html>
--
```

Based upon database information associated with the particular requesting central authority, combined with other types of selection parameters, a pre-stored list of entities which have delegated authority of their websites to the administration server using CNAME records as discussed previously is accessed and a text file created listing each entity serially and stored 79. The zone files associated with each entity which have been delegated to server 26 are then edited 81, published to DNS, and checked for errors 82-87. In particular, the A NAME record associated with or corresponding to the CNAME record resident on each entity's DNS server 13 effects a CNAME deflection to the EAW webpage 56.

While in the preferred embodiment the retrieval of a static list of entities is directly associated with the a particular central authority action of making an EAA request, the inventors envision various ways of populating an entity list in response to the submission of an EAA request. For example, a central authority, or their delegate, may use a graphical user interface to select certain geographical boundaries such as townships, counties, is boroughs, metropolitan zones, etc. Such a front-end interface would then either associate a numerical value with a requesting authority's EAA request (similar to multiple "state change" requests in application Ser. No. 11/961,686) to enable the administration server 26 to retrieve a pre-populated entity list from the SQL database for processing, or alternatively the front-end interface application could itself create an entity list file that is transferred to the administration server 26 using known ftp file transfer methods and deposited in a file directory associated with the requesting authority when an EAA request is encountered. Various types of geographical selection interfaces are known in the art, such as polygon extraction and association, and data table matching of pixel positions on a screen interface. At least one such interface called Geographical User Interface for Decision Enhancement ("GUIDE"), which is a java based software used in the Government sector, is known in the industry as of the filing date of this application.

Figure 4:
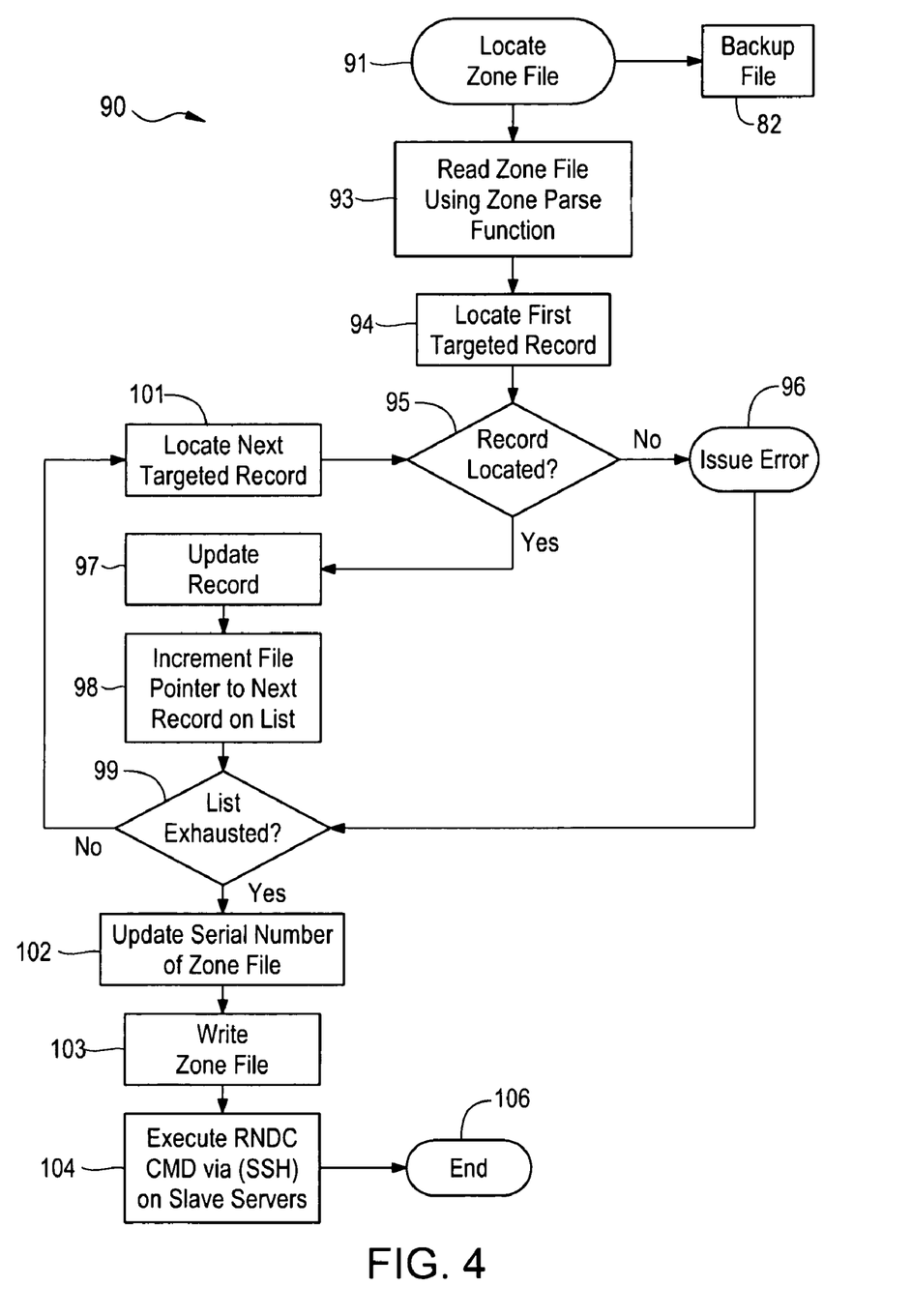
FIG. 4 is an expanded view of the zone files alteration step of FIG. 3.

The implementation of the alterations to the DNS zone file in step 81 is accomplished as indicated in FIG. 4, and are written in PERL and/or BASH program scripts an example of which is shown in Table 7.0 below. One will note that the processing steps for altering each zone file shown in process 60 of FIG. 4 are designed to accommodate multiple websites and multiple CNAME record changes in any singular zone file.

Initially, the zone file is located 91 and backed up 82, read into a memory array, and parsed 93 to locate the first targeted record 94. A targeted record consists of the CNAME record associated with the websites to be affected for the current entity that is listed within all of the A NAME records stored in the memory array. Once the targeted record is located 95 the record is updated by altering the listed record IP address to correspond with the IP address of the EAW webpage location 97 as stored in a database, and then the list is evaluated to determine if more records in the parsed zone file exist 99. If more records exist, the next targeted record is searched for 101, located 95, and updated 97 as with the previous record. If a record cannot be located at any time in the process, an error is issued 96 and the next potential record is looked for. Once the list for records in the zone file has been exhausted 99, the zone file serial number is updated 102 to correspond with the date and time change associated with the EAA request, thereby creating a unique serial number associated with each update to the zone file in response to each EAA request, saved 103, and published to DNS 104 by executing a RNDC command via SSH for all slave servers 28 associated with the administration DNS servers 26. The next zone file for the particular entity being processed on the entity list is then edited pursuant to the process 90 until all of the zone files for a particular entity have been edited. The next entity is then addressed pursuant to step 81 until the list of entities has been exhausted.

TABLE 7.0

Directory and File Structure Tree Located on DNS Server

```
.
|--backups/
|   |--fastcommand.com.hosts.107101414242
|   |--fastcommand.com.hosts.107101414302
|   | ...
|   `--fastcommand.com.hosts.107612212948
```

TABLE 7.0-continued

Directory and File Structure Tree Located on DNS Server

```
|--clients/
|   '--generate_sample_request.php
|--error/
|--logs/
|   '--cron.log
|--pickup/
|--processed/
|   |--14.txt
|   |--58.txt
|   |...
|   '--60.txt
|--retry/
|--scripts/
|   |--check_single.pl
|   |--cron.bash
|   |--defaults.bash
|   |--get_new.bash
|   |--process_new.bash
|   |--process_single.pl
|   |--update_zone.pl
|   '--writeLog.pl
|--zones/--> <link to dns zone files>
'--zones_main/--> <link to dns zone files>
```

Cron Entry 0,3,6,9,12,15,18,21,24,27,30,33,36,39,42,45,48,51,54,57 * * * *
/home/fastcommand/scripts/cron.bash
2>&1>>/home/fastcommand/logs/cron.log Standard out and standard error are redirected to the cron.log file in order to log all output of the cron.bash command.

As shown in FIG. 4, initially the zone file on the server computer 26 is located 81 and backed up 82. Once the zone file is read into a memory array and a parse function in PERL is invoked 83. Upon the reading of the zone file the information in the zone file is read into a memory array. Once the information is read into the memory array the targeted record which corresponds with the CNAME record associated with the deflection requesting entity, is located within a listing of all of the A NAME records held by the memory array 84. Once the record is located, an update to the record proceeds 87. However if the record is not located 85, an error is issued and the deflection process is terminated 86. The updating of the record 87 consists of altering the listed IP address to correspond with the IP address of the website corresponding to the selected state in the deflection request as recorded in the database. The serial number of the zone file is then updated 88 to correspond with the date and time change associated with the deflection request, thereby creating a unique serial number associated with each update to the zone file in response to an EAA request. The memory array holding the zone file is then written to the server hard drive 89, and a reload command 111 executed to the administration DNS server 21 as it applies to the zone file. An RNDC command is then executed 112 via SSH for all slave servers 26 associated with administration DNS servers 21.

It is preferred that the Time To Live ("TTL") of a targeted zone file be set to a relatively small value on server 26 so that any changes to the zone file are propagated through the Internet DNS system quickly. This increases DNS traffic to the server 26, when other servers who might contact the deflected entity web server, however this promotes a rapid publication of the revised EAW IP address to prevent any transient unreachable states for the web server during a EAA processing.

Figure 5:
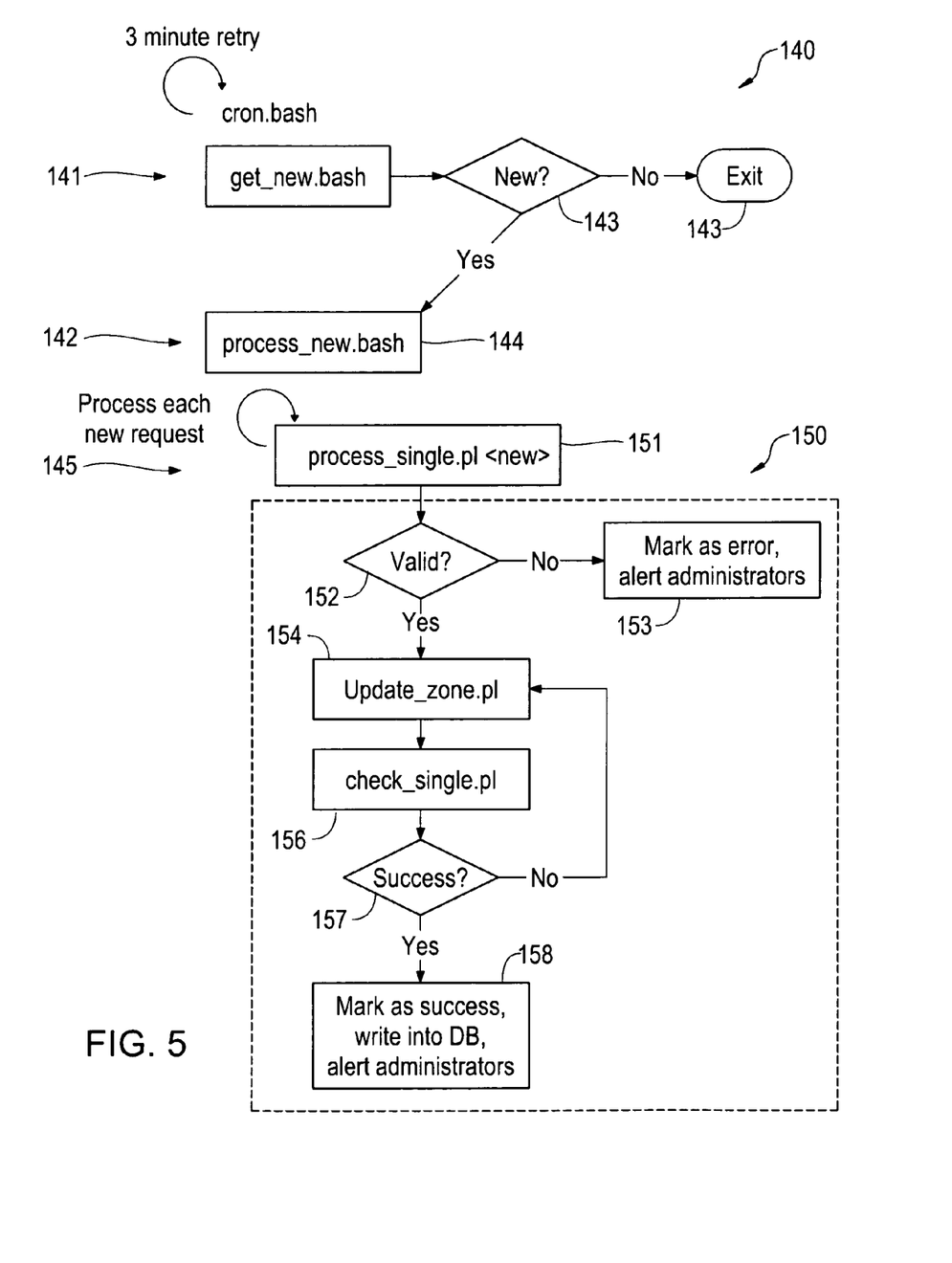
FIG. 5 is a top level scripting function map of the process steps shown in FIGS. 3 & 4.

Referring again to FIG. 3, after the zone file is altered in step 81, an error processing loop is initiated (steps 82-87) to confirm that the zone file DNS changes have been implemented. Net DNS resolver commands are initiated to all of the servers under the authority of the server 26. Each server is queried using recursor queries and the response from the other servers is compared with the IP address now recorded in the altered A records in the zone file 28 to confirm equivalence. In the event that the query is successful 83, a three digit code is returned and the loop processing program interprets the code as a failed or successful state change and the server identified that responded through a three bit identifier. If the state change is successful the administrators are alerted of the successful change 84 for that particular server, but if the state change is unsuccessful then a retry 86 is initiated and looped for a maximum of ten (10) attempts 85. If ten attempts are unsuccessful in confirming a correct state change, then a failed deflection and alert is sent to the administrator 87. It should be noted that should these error initiation attempts are sent to known IP addresses since all of the server IP addresses are known and the queries are sent directly to each server in succession. In other words, the DNS system outside of the zone of the administration servers 26 is not queried. Since the current procedures incorporate a three bit interpretation, the determination of up to three servers might be interpreted as to whether or not any or all of the changes were successful and any at the server level for the servers within the zone of authority for servers 26. Additional bits may be incorporated to address additional servers within the zone of authority for servers 26. A top level, envelope scripting representation for the processes shown in FIGS. 3 & 4 are shown in FIG. 5 to assist in script replication. The actual PERL programming steps may be found under Table 8.0 below.

TABLE 8.0

```
#!/usr/bin/perl
Return Index

# $return{"status"}

$fc[0] = "000; All Good";
$fc[1] = "001; NS1 Failed";
$fc[2] = "010; NS2 Failed";
$fc[3] = "011; NS1 & NS2 Failed";
$fc[4] = "100; NS4 Failed";
$fc[5] = "101; NS1 & NS4 Failed";
$fc[6] = "110; NS2 & NS4 Failed";
$fc[7] = "111; NS1, NS2, & NS4 Failed";

use Net::DNS;
$home = "/home/fastcommand";
$scripts = "$home/scripts";
do "$scripts/writeLog.pl";
$hostname=$ARGV[0];
$expectedip=$ARGV[1];
use Net::DNS;
my @myNameservers =
("12.150.248.34","12.150.248.35","12.150.248.45");
$temp_status_code = 1;
$status_code = 0;
foreach $server (@myNameservers) {
    my $res = Net::DNS::Resolver->new;
    $res->nameservers($server);
    my $query = $res->search($hostname);
    if ($query) {
        foreach my $rr ($query->answer) {
            next unless $rr->type eq "A";
            #print $rr->address, "\n";
            $check_hash{$server} = $rr->address;
            #print "$server ==> $check_hash{$server}\n";
            if ( $check_hash{$server} eq $expectedip ) {
                #print "Good Change\n";
            } else {
                #print "Bad Change on $server, got
                $check_hash{$server}\n";
                $status_code += $temp_status_code;
            }
        }
    }
```

TABLE 8.0-continued

```
} else {
    warn "query failed: ", $res->errorstring, "\n";
    $status_code += $temp_status_code;
}
$temp_status_code *= 2;
}
print "$status_code\n";
```

The entire process is complicated by the expiration (i.e. the "expiry") of the administration DNS server's 26 authorization to transmit data about servers 13, and therefore the efficacy of zone file 28 in the event that server(s) 13 are destroyed or disabled and can no longer issue a proper refresh command under the re-curser protocols for DNS. Hence, it is important that a sufficient length of time (i.e. the expiry must be sufficiently large) such that the required refresh time would not occlude the time of destruction during which server 26 would lose it authorization.

Figure 6:
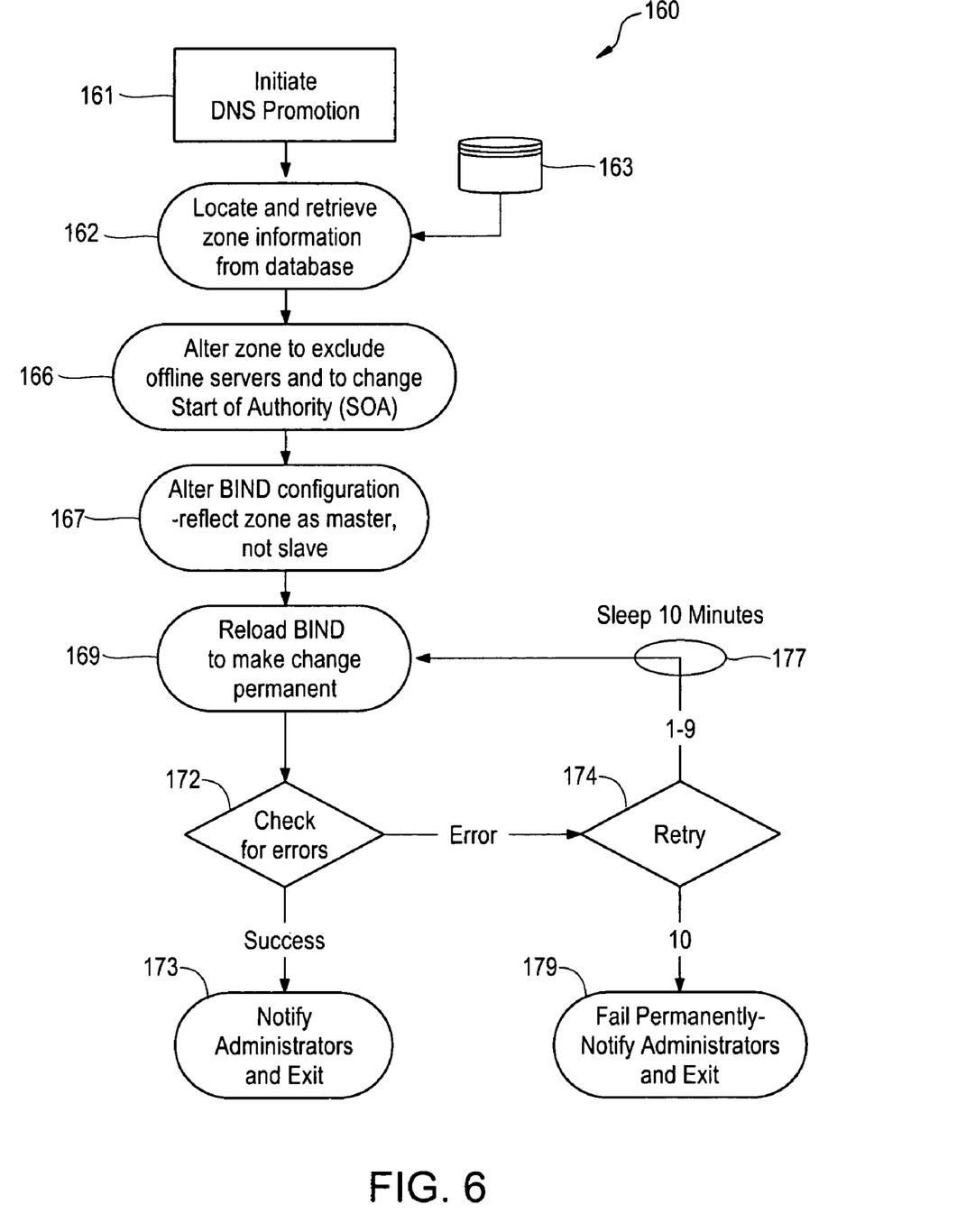
FIG. 6 is a process flow diagram showing the promotion steps associated with intelligent DNS monitoring to maintain control over the emergency alert website 56 shown in FIG. 2; and, FIG. 7 is a further process flow diagram showing the demotion steps associated with intelligent DNS monitoring.

A potential solution to this expiry complication may be implemented by establishing an intelligent DNS monitoring system for the specified entity servers 13. A process 160 addresses the expiry issue by promoting an administration server to become the authoritative server for the entity server from which expiry is threatened. Process 160 uses Bind queries continually to search for key records pre-defined in the Bind application to determine when the primary DNS authority server become unresponsive. Upon that condition becoming true, promotion proceeds in accordance with the process 160.

Referring to FIG. 6, process 160 is initiated as a DNS promotion strategy 161. The zone information for the targeted zone file is acquired 162 from a stored database 163. The zone file is then altered to exclude offline servers and the start of authority in the file is changed 166. The BIND configuration of the zone is then altered to make the zone the master instead of the slave 167, and the zone file is reloaded into BIND to install the changes 169. The new configuration is checked for errors 172 up to 9 times during a 90 minute period (9 times in successive 10 minute increments) 174, with the $10^{th}$ error triggering a "failed permanently" message sent to the administrator 179. Success is signified to the administrators when achieved within the specified time period 173.

Figure 7:
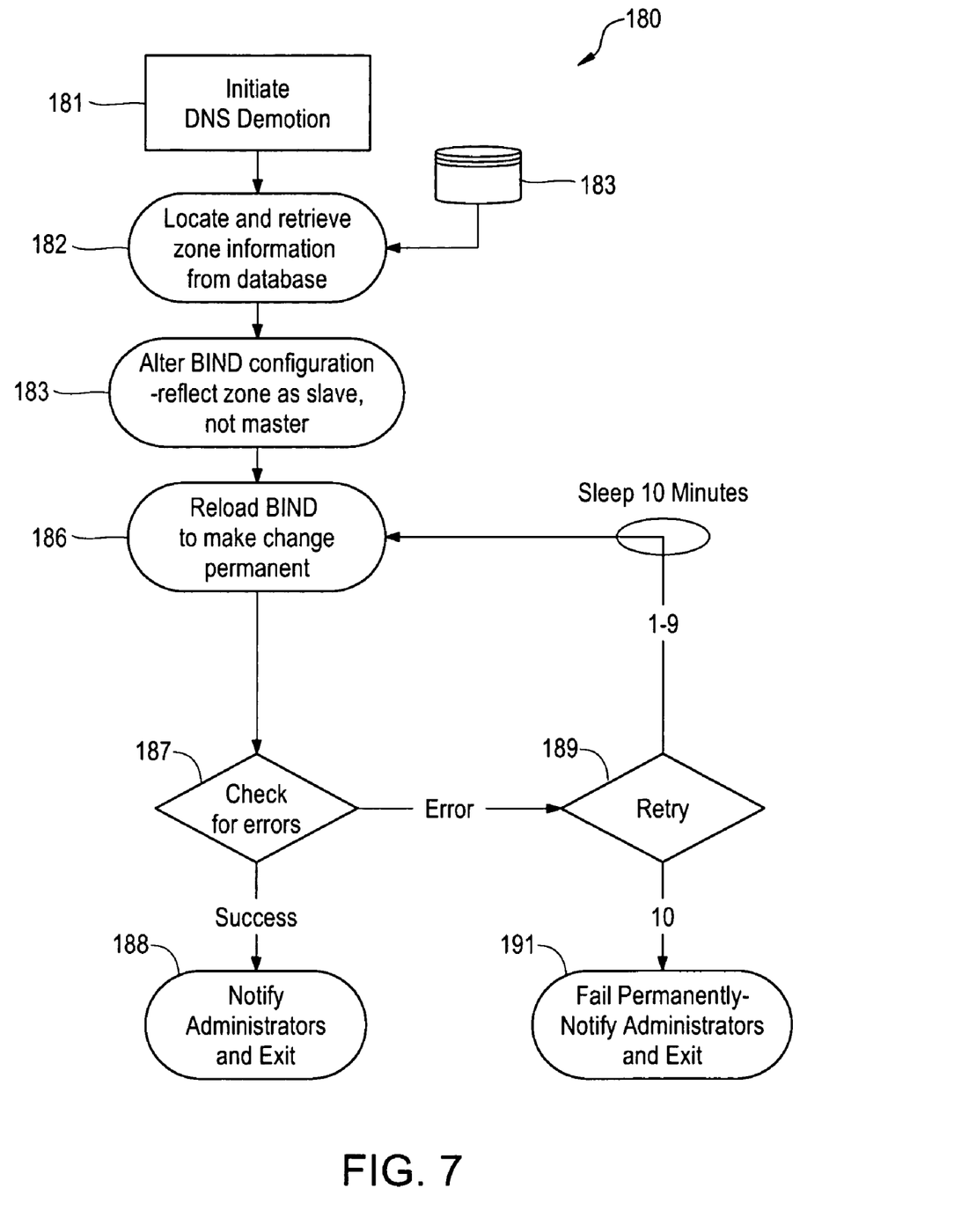

While DNS promotion as shown in process 160 will alleviate expiry problems, authority will likely wish to be restored to an entity server 13 at an appropriate time. FIG. 7 shows this demotion process 180 which is achieved in an automatic manner triggered by the responsiveness (i.e. availability) of the original authoritative DNS server similar to process 160, with step 183 reversing the prior promotion process by demoting the zone to a slave to the entity server 13. While this demotion process would likely be done automatically, manual initiation of demotion could certainly be more favorable under certain circumstances. Error checking occurs in the same manner as with the promotion process 160.

It should be noted that while the above DNS promotion and demotion processes can occur without any changes in the domain records held by the applicable domain registrar for the original authoritative DNS servers affected by the promotion and demotion processes, as well as the overall deflection process described in FIGS. 2-5, it would be advantageous, or even critical in some limited circumstances, for the server IP address for the promoted DNS server to be listed in the original authoritative server domain registrar record as a named server. While certainly elective, the registering of the promoted DNS server IP address in the domain record is a good practice.

While I have shown my invention in one form, it will be obvious to those skilled in the art that it is not so limited but is susceptible of various changes and modifications without departing from the spirit thereof. For example, while the herein described system and method has been disclosed within the context of an emergency alert system, one skilled in the art will understand that this system is applicable for any type of message that an entity desires to insert into an existing webpage upon the relinquishment of DNS control to a third party server by the entity.

Having set forth the nature of the invention, what is claimed is:

1. A system for transmitting an emergency message from a central authority to a selected group of websites, comprising:
   a. a plurality of webservers each configured for delivering an original content html page;
   b. an emergency alert webserver configured to deliver a second html page, said emergency alert webserver further configured to deliver said second html page with a header frame portion relating information about an emergency event and a main frame portion relating said plurality of original content html pages;
   c. an administration computer server having an administration DNS zone file, said administration DNS zone file including a plurality of A NAME records pointing to each of the IP address of said plurality of original content html pages;
   d. each said plurality of webservers including an authority DNS computer server having a authority DNS zone file, each said authority DNS zone file including a CNAME record pointing to an A NAME record in said administration DNS zone file; and,
   e. means running on said administration computer server for automatically altering said administration DNS zone file such that said A NAME record points to the IP address of said second html page on said an emergency alert webserver upon the request of said central authority.

2. A system as recited in claim 1, wherein said automatic altering means includes:
   a. means for locating said administration DNS zone file;
   b. means for reading said administration DNS zone file into a memory array;
   c. means for parsing said administration DNS zone file and locating each said A NAME record;
   d. means for updating each said A NAME record to point to said second html page;
   e. means for updating the serial number of said administration DNS zone file;
   f. means for writing and reloading said administration DNS zone file on said administration server; and,
   g. means for propagating information in said altered administration DNS zone file to any extant slave servers.

3. A system as recited in claim 2, wherein said administration computer server includes means for initiating and validating said central authority request, comprising:
   a. means for writing a drop-off file into a predefined directory on said administration server;
   b. database means for writing central authority data into said drop-off file corresponding to the identity of said central authority and information about said webservers affected by such request, and,
   c. means for validating the content of said drop-off file and initiating an emergency alert processing request.

4. A system as recited in claim 3, wherein said emergency alert webserver and said administration computer server reside on the same computer system.

5. A system as recited in claim 3, further including means for presenting a selectable menu to said central authority to trigger said automatic altering means.

6. A system as recited in claim 3, wherein said header frame portion is pre-stored on said emergency alert webserver.

7. A system as recited in claim 3, wherein said header frame portion includes one or more multimedia file links.

8. A method for transmitting an emergency message from a central authority to selected group of websites, comprising the steps of:
   a. receiving an emergency alert request from a central authority on a DNS administration server;
   b. validating the request;
   c. retrieving pre-stored information correlating the emergency alert request to stored alert state settings;
   d. retrieving emergency alert message content;
   e. creating an emergency message webpage header frame;
   f. creating a list of websites affected by said alert request;
   g. altering all zone files containing A NAME records pointing to said affected websites in said website list to re-associate the A NAME record IP address to the address of an alternate website holding said header frame; and,
   h. verifying that the alteration to said zone file has been successfully propagated to all servers within the authority of said administration DNS server.

9. The method of claim 8, wherein said step of creating said list of affected websites comprises receiving a file generated by a remote computer, and wherein said list creation comprises the steps of using a graphical user interface to select a geographical region associated with websites related to said selected geographical region, creating a file listing said websites, and transmitting said file to said administration server.

10. The method of claim 8, further comprising the step of applying hierarchical rules to alter said step of creating said list of affected websites in response to the receipt of overlapping emergency alert requests from multiple central authorities.

11. The method of claim 8, wherein said step of altering said zone file comprises the steps of:
   a. locating said zone file;
   b. reading said zone file into a memory array;
   c. parsing said zone file and locating said A NAME record;
   d. changing the IP address associated with said A NAME record to point to said second webserver;
   e. changing the serial number of said zone file;
   f. writing and re-loading said zone file onto said administration server; and,
   g. propagating said altered zone file to any existent slave servers.

12. The method of claim 11, further comprising the step of obtaining emergency alert information from a remote webserver under the control of said central authority.

13. The method of claim 12, further comprising the step of promoting said DNS administration server to become the authoritative DNS server for each said website affected by said alert request.

14. The method of claim 13, wherein said promotion step occurs upon the unavailability of all of the authoritative DNS servers for any said websites affected by said alert request.

15. The method of claim 14, further including the step of demoting said DNS administration server upon the availability of one or more of said authoritative DNS servers for any said websites affected by said alert request.

16. The method of claim 8, wherein said step of receiving an emergency alert request from a central authority occurs in response to the activation of the emergency alert system.

17. The method of claim 16, wherein said step of receiving an emergency alert request from a central authority in response to the activation of the emergency alert system further comprises the further step of transmitting a request signal from a TV broadcast transmission tower.

18. A system for transmitting an emergency message from a central authority to a selected group of websites, comprising:
   a. a plurality of webservers each configured for delivering at least one webpage;
   b. an emergency alert webserver configured to deliver an emergency alert webpage;
   c. an administration computer server having at least one DNS zone file, said at least one administration DNS zone files including a plurality of A NAME records;
   d. wherein each said plurality of webservers includes a zone file having a CNAME record pointing to at least one of said plurality of A NAME records listed in said at least one administration DNS zone file;
   e. wherein each of said A NAME records to which each said CNAME record points back to each of the respective IP addresses of the webserver listing the CNAME record in said plurality of webservers; and,
   f. means running on said administration computer server for automatically altering each said A NAME record to which each CNAME record points in said at least one administration DNS zone file such that said A NAME record points to the IP address of said emergency alert webpage upon the request of said central authority.

19. The system of claim 18, wherein said emergency alert webserver further comprises means for presenting said emergency message in a header frame web page content from said plurality of webservers in a main body frame.

20. The system of claim 19, further comprising a remote computer server for providing said emergency message to said emergency alert webserver.

21. The system of claim 18, further comprising means for receiving multiple requests for transmitting emergency messages from a plurality of central authorities.

22. The system of claim 18, further comprising means for promoting said administration computing system to become a DNS authoritative computer server for each said original content website.

23. The system of claim 18, wherein said system includes means for initiating said emergency alert requests in response to activation of the emergency alert system.

24. A system for a central authority to transmit an emergency message to selected group of Internet websites, comprising:
   a. an administration computing system, said administration computing system including a DNS administration application and a webserver application, said administration computing system further including at least one computer system;
   b. said administration computing system including at least one DNS zone file, said at least one zone file including a plurality of A NAME records pointing to the IP addresses of a plurality of original content websites, wherein each said original content website is controlled by a DNS computer server having a DNS zone file that includes a CNAME record pointing to said corresponding A NAME record on said administration computer system zone file;
   c. means running on said administration computing system for receiving requests from a central authority for submitting emergency alert message deployment requests;

d. responsive to said request receiving means, means running on said administration computing system for altering said at least one zone file on said administration computing system altering each said A NAME record IP address corresponding to each original content website to an IP address for an emergency alert website; and, e. wherein said webserver includes means for serving said emergency alert website, and wherein said webserver means further includes means for providing said original content for any remote computing device requesting said original content over the Internet and an emergency alert message together in a single webpage.

25. The system of claim 24, wherein said means for serving said emergency alert website further comprises means for presenting said emergency alert message in a header frame and said original content in a main body frame.

26. The system of claim 25, further comprising a remote computer server for providing said emergency alert message to said webserver means.

27. The system of claim 25, wherein said system includes means for initiating said emergency alert requests in response to activation of the emergency alert system.

28. The system of claim 24, further comprising means for receiving multiple requests for transmitting emergency messages from a plurality of central authorities.

29. The system of claim 24, further comprising means for promoting said administration computing system to become a DNS authoritative computer server for each said original content website.

\* \* \* \* \*